7566X
J. G. WILSON.
Tailor's Measure.
Patented May 3, 1833.
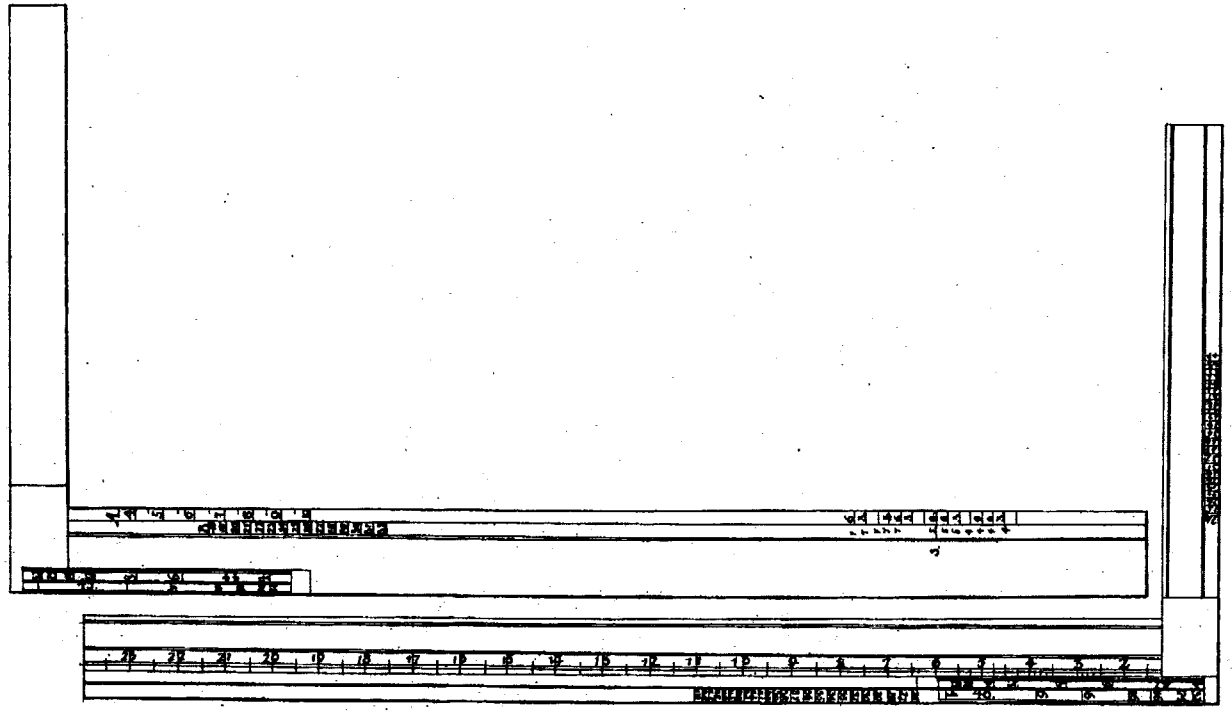
THE NORRIS PETERS CO., PHOTO-LITHO., WASHINGTON, D. C.

James G Wilson City of New York.

The Schedule referred to in these Letters Patent, and making part
of the same, containing a description in the words of the said James G.
Wilson himself of his improvement in the Rule, for cutting Garments.

---

To all to whom these presents shall come. I James G Wilson of
the City of New York send Greeting. ——
Be it known that I the said James G Wilson have invented a
new and useful Rule for cutting Garments, not known or used before in
the cutting of garments, which is described as follows to wit:
The rule is made two inches wide more or less and twelve
inches long more or less, and is made of any material suited for a
graduating instrument, the breast measure of a man governs and gives
the distances of the divisions on the ruler, first the size is taken and
any given number for a man's breast may be found on that ruler com-
mencing from twenty four inches and opposite to six inches on the square
and running to eleven and one half inches, these numbers are one fourth
of the size around a man commencing at the end of the square where
the inches commence their number on the opposite side of the ruler,
and against the fourth inch commences a scale of thirds and running
to 14¾, being a sixth of the distance around a man; on the opposite
side from these numbers, and commencing at three eighth's of an inch,
is a groove or space left in the ruler up to five and three quarter inches
in which is a scale of smaller divisions of the breast, being fourths, eighths
sixteenths, and thirty two seconds also three, six and twelfths, these
scales are held to the plane by a groove being left at each end of the
opening of the ruler so as to admit the end of the scales, this groove is covered
top and bottom by metal, to admit the ends of these scales of sufficient
tightness to hold them in their places, they may also be held in by springs
or [illegible] placed on the ruler, four sizes may be placed on one scale,
six of them accompanying each ruler. ——

7566X

I do not claim the division of the measure on the mountain of a plain ruler, nor the materials of which it is made, but I do claim the particular mode of the construction and improvements, and the use to which these improvements may be applied.

New York December 29th 1832.

Witnesses
Geo. White
Ford. L. Wilson

James G. Wilson.

476

(476 [illegible])

Patented 29th May 1833.
(Per in port folio)